Jan. 7, 1941.  J. A. FAVRE  2,227,967
MOUNTING FOR ELECTRICAL APPARATUS
Filed March 29, 1940  2 Sheets-Sheet 1
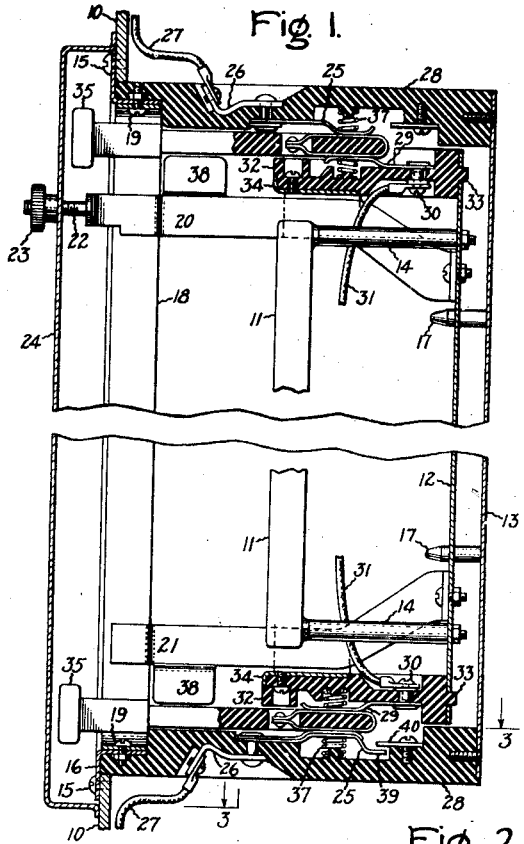
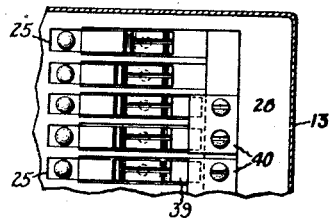
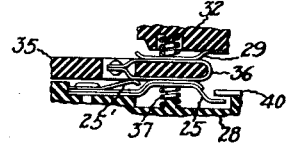
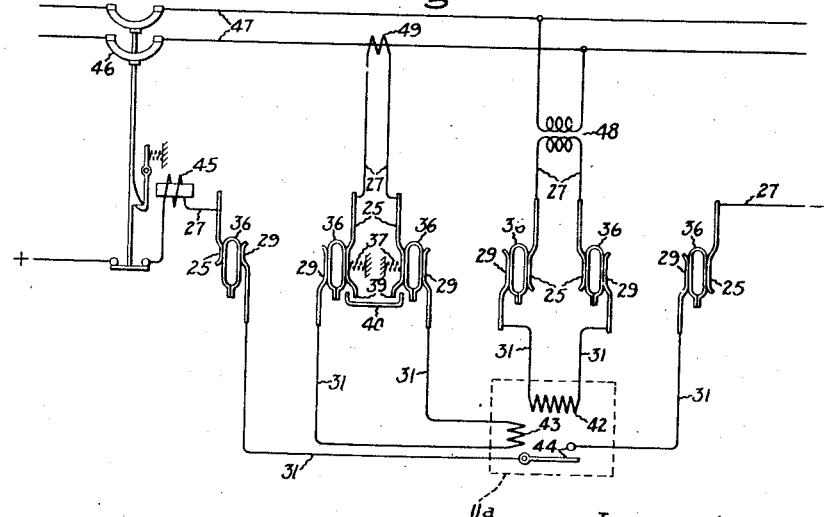
Inventor:
John A. Favre,
by Harry E. Dunham
His Attorney.

Jan. 7, 1941.    J. A. FAVRE    2,227,967
MOUNTING FOR ELECTRICAL APPARATUS
Filed March 29, 1940    2 Sheets-Sheet 2
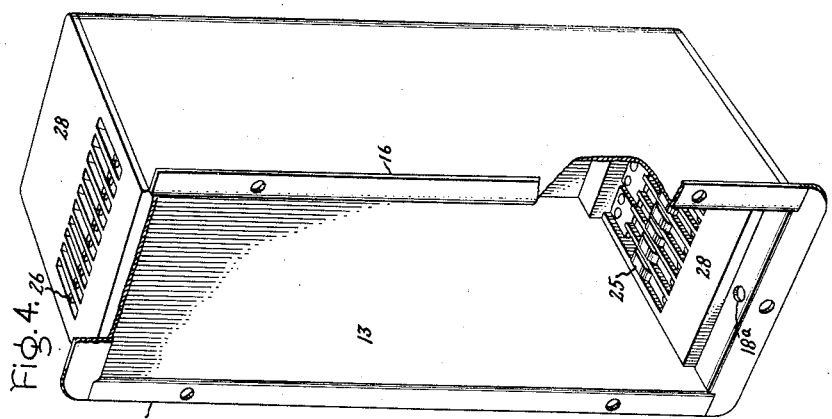
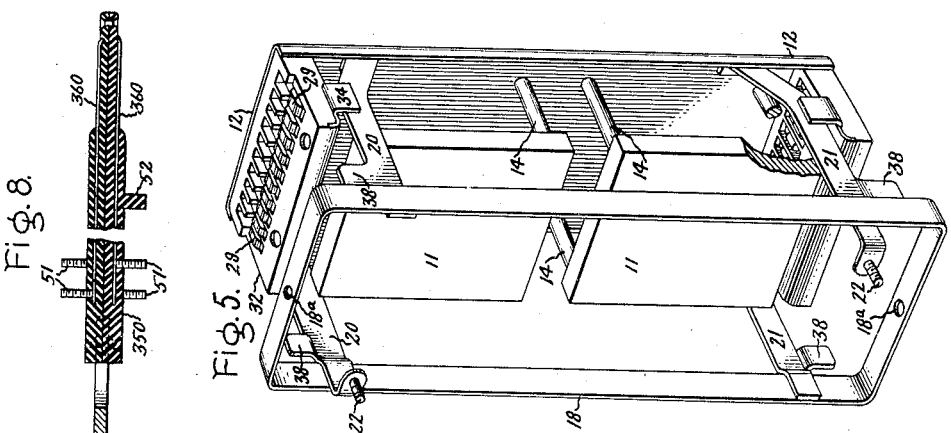
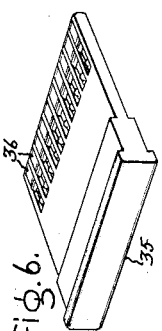
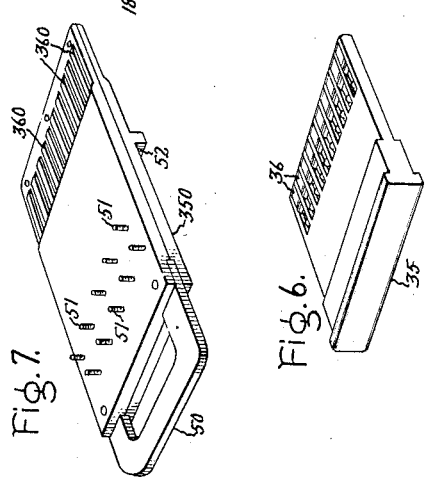
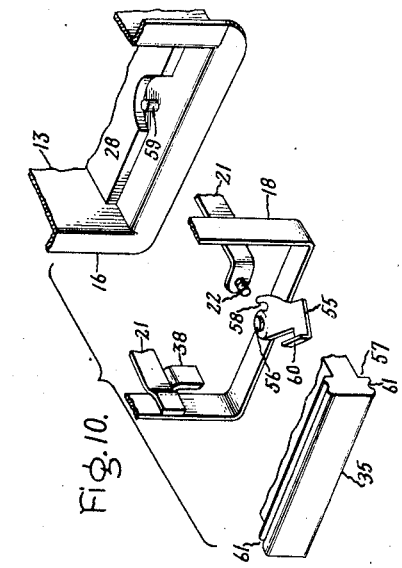
Inventor:
John A. Favre,
by Harry E. Dunbar
His Attorney.

Patented Jan. 7, 1941

2,227,967

UNITED STATES PATENT OFFICE 2,227,967

MOUNTING FOR ELECTRICAL APPARATUS

John A. Favre, Drexel Hill, Pa., assignor to General Electric Company, a corporation of New York Application March 29, 1940, Serial No. 326,653

21 Claims. (Cl. 175—298)

My invention relates to improvements in mounting for electrical apparatus as on switchboards and the like and more particularly flush mounting of relays, meters and the like.

Surface mounting, that is, mounting electrical apparatus on the front of a switchboard is objectionable since differences in size, shape, etc., of the various devices produce an irregular canyonlike effect thereby causing shadows and reduction in visibility.

Moreover, such lack of uniformity would cause some devices to stand out more prominently than others whose functions might be just as important or even more so. However, the devices were partly accessible from the front of the switchboard for inspection, maintenance and testing, particularly when the switchboard was provided, as shown, for example, in United States Letters Patent No. 1,718,529, dated June 25, 1929, with some form of test block, plug and cover, or the like, suitably coordinated with the device. The desire for better visibility, more uniformity and better appearance resulted in the so-called flush mounting wherein the face or front of the device is substantially in the plane of the switchboard. But, with this mounting, accessibility from the front of the switchboard is practically lost because so much of the device is back of the switchboard where it is undesirable, inconvenient and at times dangerous to work. Also with both surfaces and flush mountings, the necessity for removing several terminal connections in order to remove the device from the switchboard and the precautions necessary to insure the correct subsequent reconnections tend to discourage that degree of inspection, maintenance and testing which such devices should have.

One object of my invention is to provide an improved mounting such that the device can be readily removed from one side of the mounting means such, for example, as the front of the switchboard to render it accessible for inspection, maintenance, replacement and testing. A second object of my invention is to provide a mounting such that a device can be quickly and easily replaced by another without danger of false operations and then taken to the laboratory for testing thus reducing, if not entirely eliminating, the necessity for testing on the switchboard and the special equipment required therefor. A third object of my invention is to provide an improved mounting such that no circuits or connections can be inadvertently made or broken merely by removal or replacement of the device itself. A fourth object of my invention in line with the readily removable feature thereof is to prevent danger of subsequent improper reconnections when the device is replaced, thereby encouraging more frequent inspection, maintenance and testing. These and other objects of my invention will appear in more detail hereinafter.

This application is a continuation-in-part of my copending application Serial No. 262,224, filed March 16, 1939, for Mounting for electrical apparatus, the subject matter of said prior application being incorporated in this application together with additional subject matter.

My invention will be better understood from the following description when considered in connection with the accompanying two sheets of drawings, and its scope will be pointed out in the appended claims.

Fig. 1 illustrates a vertical, sectional elevation of an electrical device mounting embodying my invention; Fig. 2 is a circuit diagram explanatory of the embodiment of my invention shown in Fig. 1; Fig. 3 is a partial, horizontal plan view on the line 3—3 of Fig. 1; Fig. 4 is a view in perspective, partly broken away, of the case part of the embodiment of my mounting shown in Fig. 1; Fig. 5 is a view in perspective, partly broken away, of the frame part of the embodiment of my invention shown in Fig. 1; Fig. 6 is a view in perspective of a contact device for establishing connections between the case and the frame; Fig. 7 is a view in perspective of another contact device for establishing connections between the case or the frame or both and other apparatus; Fig. 8 is a longitudinal sectional view of the contact device shown in Fig. 7; Fig. 9 is a partly sectional partly elevational view of a modification of the contact mechanism shown in Fig. 1; and Fig. 10 is a view in perspective showing the case frame and contact device separated and in part to illustrate a modification of my invention for preventing incorrect removal and withdrawal of a device.

The several figures of the drawing exemplify my invention in an electroresponsive device flush mounting on a mounting surface such as a switchboard 10. This mounting is illustrated as comprising one or more base members 11 suitably secured in a frame 12 which is movable into and out of a case 13 having at least one open side. The switchboard 10 may be of metal or any suitable material, examples of which are well known to the art. The bases 11, which may be suitably secured to posts 14 in the frame 12, as shown more clearly in Fig. 1, serve as mounting elements for electroresponsive devices. These devices are not shown except schematically as at 11a in Fig. 2 since their specific electroresponsive structure constitutes no part of my invention. In many cases, the bases may actually be a part of the electroresponsive device itself.

In accordance with my invention, the case 13 may be inserted from the front of the switchboard 10 through an opening therein with the open side of the case toward the front of the switchboard. It may then be suitably secured to the switchboard from the front thereof as by screws 15 which pass through a flange 16 on the case and engage the switchboard directly, as shown in Fig. 1, or nuts suitably secured to the back of the switchboard. The case 13 could also be mounted from the back of the board as will be apparent to those skilled in the art. Obviously also the case 13 may be surface mounted on the switchboard or other supporting structure with either its back or one side adjacent the supporting structure. The frame 12 is insertable into the case 13 from the front of the switchboard 10 through the open side of the case. The case 13 may be provided with suitable centering means, such as guide pins 17, which enter openings in the back wall of the frame 12 as the frame 12 is inserted into the case 13. Further, in order to obtain the desired register or centering at the front of the case 13 as well as to strengthen the frame 12 and maintain suitable alignment of the parts, the frame may include a front portion or frame member 18 which just nicely fits into the front of the case 13. The frame 12 may be secured to the case 13 by any suitable holding means, such, for example, as bolts 19 in registering holes in the frame member 18 and the case 13. For securing the frame member 18 to the back portion of the frame 12, there may be provided suitable means indicated as upper and lower bracket members 20 and 21, respectively. Certain of these bracket members may include suitable means, such as threaded portions 22 for the reception of thumb nuts 23 whereby to secure a cover 24 over the assembly.

In accordance with my invention, the case 13 is provided with a plurality of contact terminals which, as shown, comprise a contact portion 25 and a terminal portion 26 for the reception of switchboard wiring 27. These contact terminals may be mounted on suitable contact terminal blocks 28 which, as shown, constitutes the top and bottom ends of the case 13 although they may be on the sides of the case, as will be obvious to those skilled in the art. Apart from this, the case 13 may be of metal though the ends could also be of metal but with the contact terminals suitably insulated.

Also, in accordance with my invention the frame 12 is provided with contact terminals comprising a contact portion 29 and a terminal portion 30 for the connection of leads or suitable conductors 31 extending from the windings, contacts, etc., of the electroresponsive devices. These contacting terminals may also be mounted on suitable insulating blocks 32 which are suitably secured to the frame 12. Thus, as shown in Fig. 1, the blocks 32 have a projecting portion 33 which registers with a hole in the back of the frame 12, and they are further suitably secured to cross frame members 34 which may extend across the brackets 20 and 21 as will be more clearly evident from Fig. 5. These cross frame members 34 may be secured to the brackets in any suitable manner as by spot welding or otherwise.

Further, in accordance with my invention, I provide means operable from the front of the switchboard 10 for establishing an electric current conducting connection between the contacts 25 in the case 13 and the contacts 29 in the frame 12 when the frame is in a predetermined position in the case. As shown, this means comprises a plug 35 which is provided with suitable bridging conductive portions 36 which, when the plug is inserted, as shown in Fig. 1, move in between the respective pairs of corresponding contacts 25 and 29 to engage these contacts and complete a circuit between them. If desirable, suitable contact pressure may be obtained by the addition of springs 37 which tend to move the contacts 25 and 29 toward each other although not causing engagement of the contacts of themselves when the plug is removed. As shown, the front end of the plug is ridged so that it may be easily grasped for insertion and removal. Also, as shown, the brackets 20 and 21 may be provided with ears or guiding lugs 38 which guide the plug 35 particularly at its insertion so as to insure that it enters properly between the contacts 25 and 29. It will be clear from Fig. 1 that no circuits or connections can be inadvertently made or broken by moving the frame 12 into or out of the case 13 while the plug or plugs 35 are positioned between the frame 12 and the case 13 since in this position each plug 35 covers or renders inaccessible one of the holding or fastening means 19. In other words, no relay, meter, etc. can be withdrawn until it is completely de-energized by first removing the plug or plugs 35. This feature provides safety for both personnel and apparatus besides preventing possible false operation of apparatus since it insures a positive sequence of circuit control by each plug as will hereinafter more clearly appear.

Wherever an electroresponsive device is used which is energized from a current transformer, removal of the plugs might result in open circuiting the transformer and causing dangerous voltages. In accordance with my invention, I arrange certain of the contacts to avoid this possibility. Thus, as shown, for example, at the bottom of Fig. 2, the contact 25 has an extending end 39 which, when the plug is removed and the spring 37 presses upwardly on the contact, causes the end 39 to contact a short-circuiting strip or bar 40. Thus two such contacts engaging the bar 40 would result in short-circuiting the two wires 27 leading to the contact. Thus the leads to a current transformer may be short-circuited upon removal of the plug 35 so as to avoid the undesirable high voltages which may occur with an open circuited current transformer.

Since in the processes of manufacture, slight variations in assembly of the parts or in dimensions of the contact members 25, etc., might possibly result in the release of one of these contacts to engage the short-circuiting strip 40 before the other contact in the same current transformer circuit is released, the current transformer might be open-circuited. Even though this were to be only momentary, it means a sudden voltage increase and possible insulation breakdown. In order to take care of such manufacturing variations, I may provide suitable means, such as an auxiliary contact 25', which will maintain contact with the cooperating contact strip 36 on the plug 35 until this plug is so completely withdrawn that both contacts 25 of a pair connected to a current transformer have had an opportunity to contact the short-circuiting strip 40. In other words, an open-circuit of the current transformer secondary cannot be effected either intentionally or otherwise in consequence of manufacturing variations.

In working around an electroresponsive device, such as a relay, whose contacts are arranged to control a control circuit, for example, the trip coil of a circuit breaker, jar or shock may result in unintended contact closure and thereby cause a false operation of the control circuit. To avoid this I provide, in accordance with my invention, means for establishing conducting connections between the switchboard wiring and the wiring of the electroresponsive device in a predetermined order, as shown for example in Fig. 1. This is accomplished by controlling the lengths of the contacts 25 or at least that portion of the contacts which engages the bridging contact strips 36. Thus, referring, for example, to Fig. 1, it will be observed that in inserting the lower plug 35 a conducting relation is established between the associated contacts 25 and 29 before this plug is inserted as far as is necessary for the upper plug 35 to engage its cooperating contacts 25 and 29 since the contacting portions of the contacts 25 and 29, shown at the bottom, extend farther to the front of the switchboard than the contacting portions of the contacts 25 and 29 shown at the top. It will be understood, of course, that this arrangement is applicable to one or both plugs. The illustrated arrangement, for simplicity, shows the upper contacts 25 and 29 shorter than the lower contacts 25 and 29, but this is merely an expedient for illustrating my invention since in general both short and long contacts will occur at the top and bottom of the case 13 as will appear from Fig. 3. Moreover, since the order of contact closure is dependent on the lengths and positioning of the contacts in the bases or ends 28 of the case 13 only one standard plug is needed and obviously such plug cannot be erroneously inserted.

Before considering the operation of the embodiment of my invention described, it may be assumed, for example, that the electroresponsive device is a simple, single phase circuit closing power directional relay. Such a relay, as schematically indicated at 11a in Fig. 2, would include, as is well known to the art, a potential winding 42, a current winding 43 and contacts 44. The relay 11a is shown as arranged to control through its contacts 44 the circuit of a trip coil 45 of a latch-closed circuit breaker 46 in a circuit 47. The potential winding 42 is energized from a potential transformer 48 whose switchboard wiring 27 is connected to the contacts 25 and through the bridging contact strips on one of the plugs 35 to the contacts 29 in the frame which are connected to the potential winding 42 through the conducting leads 31. The current winding 43 is energized from a current transformer 49 whose switchboard wiring 27 is connected to the case contacts 25. These contacts are arranged to be connected through the bridging members 36 of the plug 35 of frame contacts 29 which are connected to the current coil 43 through the relay leads 31. In this case, as previously mentioned, the contacts 25 connected to the current transformer 49 have the short-circuiting bar 40 which they engage upon the release of the plug 35. In the wiring arrangement shown in Fig. 2, I have illustrated the trip coil circuit as including two pairs of contacts 25 and 29 in series in order that there may be no chance of energizing the coil by a possible accidental ground as the plug 35 is removed. In this case one or both pairs of contacts 25 and 29 may be of the short type so as to obtain conducting connections in a predetermined order. In general, however, it will be sufficient if the contacts 25 and 29, nearer the trip coil or device to be controlled, are of the short type in which the initial movement causes circuit interruption before interruption of the other series connected contacts is effected. Obviously, as far as my invention is concerned, the order in which connections are established between case terminal contacts and the corresponding frame terminal contacts may be arranged to suit the immediate purpose in hand.

If now it be assumed that the electroresponsive device, such as the relay 11a just described, is in the normal switchboard position shown in Fig. 1 and that it is desired to remove the relay for adjustment, maintenance, inspection, testing, etc., the cover 24 may be removed by backing off the thumb screws 23. The plugs 35 are then removed whereupon the relay is completely disconnected from its energizing and control circuits. The frame 12 together with the relay mounted on the base 11 may then be withdrawn from the case 13. Obviously the frame cannot be withdrawn until both plugs are taken out. The combination thus removed can be immediately replaced by another similar equipment with the steps in a reverse order to the procedure just described and without interfering with the ordinary processes of station operation. Subsequently, the removed combination including the relay can be taken to the laboratory or a place where suitable testing sources are available. It can then be repaired, adjusted, tested, or whatever is necessary to be done to make it ready for service.

In order to take care of those conditions where it is desirable, for example, to test a device in place on the switchboard, I may provide an auxiliary contact means or test plug 350, as shown in Figs. 7 and 8. For engaging the contacts on the frame 12 and the case 13, the auxiliary plug 350 may be provided with a plurality of conducting strips 360. These may be moulded into the insulation when the plug is formed, if so desired. In the specific construction shown, the auxiliary plug 350 is made of two halves suitably secured together and provided with a handle 50 to assist in withdrawal and entry. The contact strips 360 may be provided with suitable terminals 51 threaded, for example, to receive nuts whereby wiring may be connected to these terminals in any desired order. Of course, as will be obvious to those skilled in the art, any two terminals may be interconnected at will to insure, for example, that a current transformer secondary is maintained short-circuited when the auxiliary or test plug is inserted. Inasmuch as, in general, the connections to the terminals 51 of the test plug would be made before inserting the plug, the plug must not be insertable in the wrong way. To be sure of a correct insertion, I may provide, in accordance with my invention, suitable insertion prevention means, such for example, as a projecting portion 52 of such a height that, upon any attempt to insert the plug upside down, this projection will engage the end of the frame member 18 before the plug can be inserted far enough to engage the contacts 25 and 29 on the case and frame, respectively. The length of the projection 52 transversely of the test plug 350 is such that it cannot engage the ears or guiding lugs 38 on the brackets 20, 21 when it is inserted.

A simple electroresponsive device, such as the relay 11a just described, may require only a single plug 35. On the other hand, more complicated electroresponsive devices, such for example, as a distance relay or a polyphase power directional relay or a polyphase meter, may require both plugs, or it may be desirable to have certain connections from the top of the case and certain other connections from the bottom or even from the sides. Thus, in general, in order to have greater flexibility and uniformity of application, I may provide cases, such as illustrated, to cover a given range of application so that, if desired, for example, two or more simple relays, such as the relay 11a described, may be mounted in a single case. The different combinations of arrangements possible will be obvious to those skilled in the art relating to relaying, metering and the like.

While the fastening means 19, shown in Fig. 1, for holding the frame 12 in the case 13 until the plug or plugs 35 are removed is, in general, satisfactory, there is nothing to insure that the fastening means is in place, that is, in holding position, before the plug, which prevents its removal, is inserted. Accordingly, as shown in Fig. 10, I provide a positive interlock between the plug 35 and the fastening means such that the plug cannot be fully inserted to contacting position without either the fastening means being in position to hold the frame in the case or causing the actuation of the fastening means to such holding position. Thus, for example, I may provide suitable fastening means, such as a latching member 55, which is pivotally mounted, as at 56, on the frame member 18 so as to be in the path of movement of a projecting shoulder 57 on the plug 35 whereby movement of the plug to the contacting position will move the latching member to the latching position if it has not been previously so moved. The latching member is provided with a hook-shaped portion 58 which is movable to engage suitable means, such as a pin 59 mounted in the frame 13. The latching member 55 may be provided with a flanged portion 60 for movement either by hand or to engage the shoulder 57 on the plug 35.

The shape of the hook portion 58 of the latching member 55 may be such as to give a desired camming or wedging action to force the cam into position in the case and also hold it against shaking. One way to accomplish this is to have the curved edge of the hook 58, which engages the pin 59, substantially concentric with the axis of rotation of the latch, as shown, with the pin 59 set back slightly greater than the radius of curvature of this edge. Then, when the pointed end of the hook engages the pin 59, it is sprung outwardly enough to produce the effect of a cam so as to secure a wedging action as the latching member 55 is pushed into the locking position. This makes it possible to limit the stresses on the pivot 56 and the pin 59 to the elastic limit of the latch hook 58 and thus avoid severe strains which might otherwise occur because of dimensional variations in manufacture. The slight amount of set back of the pin 59 will avoid shake in any case, and if the distance between the pivot 56 and the pin 59 is increased, the hook can bend sufficiently to accommodate the difference.

After the plug 35 is removed, the latch 55 may be disengaged from the pin 59 by pulling outwardly on the flange 60. Similar latching means may be provided at both the top and bottom of the case 13 and frame 12. In order to obtain a better hold on the plug 35, the handle portion thereof may be fluted as at 61. With this modification of my invention, it will be obvious that the operation of fastening the frame 12 in the case 13 cannot be omitted because the plug 35 cannot be inserted to a contacting position without a completion of the fastening operation. This precludes any possibility of pulling out the frame and plug together since the plug must first be removed before the latching means can be released.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a switchboard mounting for an electroresponsive device, such as relays, meters and the like, a case having one side open and adapted to be inserted through an opening in the switchboard with said open side toward the front thereof, terminal contacts carried by said case for the connection of switchboard wiring, an electroresponsive device frame insertable into said case through said open side thereof, terminal contacts carried by said frame corresponding to the terminal contacts carried by said case for connection to the electroresponsive device, and conducting means insertable through said open side of the case when the frame is in a predetermined position in the case for establishing an electric current conducting connection between different pairs of corresponding terminal contacts on the case and on the frame in a predetermined order.

2. In a switchboard mounting for an electroresponsive device, such as relays, meters and the like, a case having one side open and adapted to be inserted through an opening in the switchboard with said open side toward the front thereof, terminal contacts carried by said case for the connection of switchboard wiring, an electroresponsive device frame insertable into said case through said open side thereof, terminal contacts carried by said frame corresponding to the terminal contacts in said case for connection to the electroresponsive device, conducting means insertable through said open side of the case when the frame is in a predetermined position in the case for establishing an electric current conducting connection between different pairs of corresponding terminal contacts carried by the case and by the frame, and means on the case for short-circuiting at least two of the terminal contacts carried by the case when said conducting means is removed.

3. In a switchboard mounting for an electroresponsive device, such as relays, meters and the like, a case having at least one side open and adapted to be inserted through an opening in the switchboard and secured thereto with the open side at the front of the switchboard, terminal contacts carried by said case for the connection of switchboard wiring, a device frame insertable into said case through the open side thereof, contact terminals carried by said frame for connection to the electroresponsive device corresponding to the contact terminals carried by the case, and a plug insertable through the open side of the case between the terminal contacts carried by said case and the corresponding terminal contacts carried by said frame for establishing conducting connections between the switchboard wiring and the electroresponsive device.

4. In a switchboard mounting for an electroresponsive device, such as relays, meters and the like, a case having at least one side open and adapted to be inserted through an opening in the switchboard and secured thereto with the open side at the front of the switchboard, terminal contacts carried by said case for the connection of switchboard wiring, a device frame insertable into said case through the open side thereof, contact terminals carried by said frame for connection to the electroresponsive device corresponding to the contact terminals carried by the case, a plug insertable through the open side of said case between the terminal contacts carried by said case and the corresponding terminal contacts carried by said frame for establishing conducting connections between the switchboard wiring and the electroresponsive device, and means for short-circuiting a predetermined number of the terminal contacts in said case when said plug is withdrawn a predetermined amount.

5. In a switchboard mounting for an electroresponsive device, such as relays, meters and the like, a case having at least one side open and adapted to be inserted through an opening in the switchboard and secured thereto with the open side at the front of the switchboard, terminal contacts carried by said case for the connection of switchboard wiring, a device frame insertable into said case through the open side thereof, contact terminals carried by said frame for connection to the electroresponsive device corresponding to the contact terminals carried by the case, a plug insertable through the open side of said case between the terminal contacts carried by said case and the corresponding terminal contacts carried by the frame for establishing conducting connections between the switchboard wiring and the electroresponsive device, said plug being arranged upon withdrawal to disengage one terminal contact on the case and the corresponding terminal contact on the frame before disengagement from another pair of corresponding terminal contacts.

6. In a switchboard mounting for an electroresponsive device, such as relays, meters and the like, a case having one side open and adapted to be inserted through an opening in the switchboard with the open side toward the front thereof, a terminal contact carried by said case for the connection of switchboard wiring, an electroresponsive device frame insertable into said case through the open side thereof, a terminal contact carried by said frame for connection to the electroresponsive device, and means operable from the front of the switchboard for establishing an electric current conducting connection between the terminal contact carried by the case and the terminal contact carried by the frame when the frame is in a predetermined position in the case.

7. In combination, a switchboard having wiring at the rear thereof, a case having one side open and adapted to be inserted through an opening in the switchboard with the open side toward the front thereof, an electroresponsive device insertable into said case through the open side of the case, a pair of terminal contacts one carried by said case for connection to the switchboard wiring and the other movable with and electrically connected to said electroresponsive device, and means operable from the front of the switchboard for readily establishing and disestablishing an electric current conducting connection between said terminal contacts.

8. In a mounting for an electrical device, a case having at least one side open, means for supporting said case, a terminal contact carried by said case, an electrical device frame insertable into said case through said open side thereof, a terminal contact carried by said frame for connection to the electroresponsive device, and conducting means insertable through said open side of the case when the frame is in a predetermined position in the case for establishing an electric current conducting connection between said terminal contacts on the case and on the frame.

9. In a mounting for an electrical device, a case having at least one side open, terminal contacts carried by said case, an electrical device frame insertable into said case through said open side thereof, terminal contacts carried by said frame corresponding to the terminal contacts carried by said case for connection to said electrical device, and conducting means insertable through said open side of the case when the frame is in a predetermined position in the case for establishing an electric current conducting connection between different pairs of corresponding terminal contacts on the case and on the frame.

10. In a mounting for an electrical device, a case having at least one side open, terminal contacts carried by said case for the connection of external wiring, an electrical device frame insertable into said case through said open side thereof, terminal contacts carried by said frame for connection to the electroresponsive device, a first conducting means insertable through said open side of the case when the frame is in a predetermined position in the case for establishing a definite set of connections between the terminal contacts on the case and on the frame, and testing conducting means for replacing said first conducting means to establish another set of connections between said frame terminals and other external wiring.

11. In a mounting for an electrical device, a case having at least one side open, terminal contacts carried by said case, an electrical device frame insertable into said case through said open side thereof, terminal contacts carried by said frame corresponding to the terminal contacts carried by said case for connection to said electrical device, conducting means insertable through said open side of the case when the frame is in a predetermined position in the case for establishing an electric current conducting connection between different pairs of corresponding terminal contacts on the case and on the frame, and means for short-circuiting at least two of the terminal contacts carried by the case when said conducting means is removed.

12. In a mounting for an electrical device, a case having at least one side open, terminal contacts carried by said case, an electrical device frame insertable into said case through said open side thereof, terminal contacts carried by said frame corresponding to the terminal contacts carried by said case for connection to said electrical device, conducting means insertable through said open side of the case when the frame is in a predetermined position in the case for establishing an electric current conducting connection between different pairs of corresponding terminal contacts on the case and on the frame, and means for short-circuiting at least two of the terminal contacts carried by the case when said conducting means is removed.

13. In a mounting for an electrical device, a case having at least one side open, terminal contacts carried by said case for the connection of external wiring, an electrical device frame insertable into said case through said open side thereof, terminal contacts carried by said frame for connection to the electroresponsive device, a first conducting means insertable through said open side of the case when the frame is in a predetermined position in the case for establishing a definite set of connections between the terminal contacts on the case and on the frame, and testing conducting means for replacing said first conducting means insertable through said open side of the case in only one way to establish another set of connections between the said frame terminal contacts and other external wiring.

14. In a mounting for an electrical device, a case having at least one side open, terminal contacts carried by said case, an electrical device frame insertable into said case through said open side thereof, terminal contacts carried by said frame corresponding to the terminal contacts carried by said case for connection to said electrical device, conducting means insertable through said open side of the case when the frame is in a predetermined position in the case for establishing an electric current conducting connection between different pairs of corresponding terminal contacts on the case and on the frame, and means for guiding said frame relatively to said case and said conducting means relatively to the frame and the case whereby to insure the proper registry between the cooperating terminal contacts and the conducting means.

15. In a mounting for an electrical device, a device member, terminal contacts carried by said device member, a support for said device member, terminal contacts carried by said support, conducting means insertable between said contacts when the device member is in a predetermined position relatively to the support for establishing an electric current conducting connection between different pairs of corresponding terminal contacts on the device member and on the support, and means for short-circuiting at least two of the terminal contacts on the support when said conducting means is removed.

16. In a mounting for an electrical device, a device member, terminal contacts carried by said device member, a support for said device member, terminal contacts carried by said support, a first conducting means insertable between said contacts when the device member is in a predetermined position relatively to the support for establishing an electric current conducting connection between different pairs of corresponding terminal contacts on the device member and on the support, and testing conducting means for replacing said first conducting means insertable in only one way to establish another set of connections between the contacts on the device member and other external wiring.

17. In a mounting for an electrical device, a device member, a plurality of terminal contacts carried by said device member, a support for said device member, a plurality of terminal contacts mounted on said support respectively substantially parallel to the terminal contacts on said device member, and conducting means insertable between said contacts when the device member is in a predetermined position relatively to the support for establishing an electric current conducting connection between different pairs of corresponding terminal contacts on the device member and on the support.

18. In a mounting for an electrical device, a device member, terminal contacts carried by said device member, a support for said device member, terminal contacts carried by said support, conducting means insertable between said contacts when the device member is in a predetermined position relatively to the support for establishing an electric current conducting connection between different pairs of corresponding terminal contacts on the device member and on the support, and means for preventing relative movement of said device member and said support until said conducting means is withdrawn.

19. In a mounting for an electrical device, a case having at least one side open, terminal contacts carried by said case, an electrical device frame insertable into said case through said open side thereof, terminal contacts carried by said frame corresponding to the terminal contacts carried by said case for connection to said electrical device, conducting means insertable through said open side of the case when the frame is in a predetermined position in the case for establishing an electrical current conducting connection between different pairs of corresponding terminal contacts on the case and on the frame, and means for preventing relative movement of said frame and said case until said conducting means is withdrawn.

20. In a mounting for an electrical device, a device member, terminal contacts carried by said device member, a supporting member for said device member, terminal contacts carried by said supporting member, conducting means insertable between said contacts when the device member is in a predetermined position relatively to the supporting member for establishing an electric current conducting connection between different pairs of corresponding terminal contacts on said members, and means for preventing relative movement of said members until said conducting means is withdrawn comprising relatively movable latching elements respectively positioned on said members, one of said latching elements being mounted in the path of movement of said conducting means so that the latching elements must be in latching position before the conducting means can be inserted to the conducting position and said conducting means rendering said latching means inaccessible while in the conducting position.

21. In a mounting for an electrical device, a case having at least one side open, terminal contacts carried by said case, an electrical device frame insertable into said case through said open side thereof, terminal contacts carried by said frame corresponding to the terminal contacts carried by said case for connection to said electrical device conducting means insertable through said open side of the case when the frame is in a predetermined position in the case for establishing an electric current conducting connection between different pairs of corresponding terminal contacts on the case and on the frame, and means for preventing relative movement of said frame and said case until said conducting means is withdrawn comprising a latching member mounted on the frame and operable to engage said case when the frame is positioned therein, said latching member, when in the latching position, being rendered inaccessible by said conducting means until withdrawal thereof from the frame and case.

JOHN A. FAVRE.